United States Patent
Granata

(10) Patent No.: US 6,581,910 B1
(45) Date of Patent: Jun. 24, 2003

(54) RACK-TYPE KINEMATIC MECHANISM, IN PARTICULAR FOR VEHICLE LIFTS

(75) Inventor: Tebaldo Granata, Capelle sul Tavo (IT)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/110,609

(22) PCT Filed: Oct. 12, 1999

(86) PCT No.: PCT/IB99/01836
§ 371 (c)(1),
(2), (4) Date: Apr. 12, 2002

(87) PCT Pub. No.: WO01/27498
PCT Pub. Date: Apr. 19, 2001

(51) Int. Cl.[7] .................................................. B66F 3/02
(52) U.S. Cl. ........................ 254/95; 254/93 L; 254/105
(58) Field of Search ................................ 254/95, 133 R, 254/134, 420, 89 H, 105, 93 L; 405/196; 187/19

(56) References Cited

U.S. PATENT DOCUMENTS

| | | | |
|---|---|---|---|
| 1,486,797 A | | 3/1924 | Piper |
| 3,743,247 A | * | 7/1973 | Willke et al. ................. 254/89 |
| 3,895,682 A | * | 7/1975 | Graham ....................... 254/420 |
| 4,387,881 A | * | 6/1983 | McDuffie .................. 254/89 H |
| 4,495,828 A | | 1/1985 | Iwamoto |
| 5,094,302 A | | 3/1992 | Back |
| 5,421,555 A | * | 6/1995 | Sims ........................... 254/420 |
| 5,803,206 A | * | 9/1998 | Halstead et al. ............. 187/208 |
| 5,947,449 A | * | 9/1999 | Dube et al. ................. 254/134 |

* cited by examiner

Primary Examiner—Lee D. Wilson
(74) Attorney, Agent, or Firm—Ostrolenk, Faber, Gerb & Soffen, LLP

(57) ABSTRACT

A rack-type lift for vehicles includes a first, stationary rack and a second movable rack that supports a lifting unit. A toothed wheel that is movable within the lift between a first and second end position is interposed between the racks, which racks are so positioned relative to the toothed wheel that opposite ends of these racks engage the toothed wheel at the different of travel positions of the toothed wheel. Thereby, the lifting unit of the vehicle lift travels a distance twice as large as the toothed wheel.

9 Claims, 2 Drawing Sheets

RACK-TYPE KINEMATIC MECHANISM, IN PARTICULAR FOR VEHICLE LIFTS

BACKGROUND OF THE INVENTION

The present invention relates to a rack-type kinematic mechanism, in particular for vehicle lifts.

In the mechanical engineering field, various types of vehicle lifts are known, which are in use in mechanical engineering workshops and similar environments, in order to provide convenience access to the parts beneath the vehicle. Thus, lifts have been developed with columns which are on view, in which the rails, runways or arms to support the vehicle are translated along two or four uprights, which are secured vertically to the floor; recessed column-type lifts, which are similar to the previous type, but in which the columns are at least partially embedded below the floor; and finally lifts with scissors-type articulation, which are preferably also. recessed, in which the vertical movement of the rails or the like is provided by a scissors-type articulation disposed at the base.

Irrespective of their type, the lifts always contain cylinders., which are normally of the oleodynamic, i.e., hydraulic, type, and are designed to move the lift. In the known lifts, the kinematic mechanism is such as to require substantial cylinder dimensions, with consequent disadvantages in terms of dimensions when the lift is lowers, and of costs.

U.S. Pat. No. 4,495,828 discloses a rack-type kinematic mechanism comprising a first, fixed rack and a second rack which is mobile and supports a lifting unit. Two toothed wheels being connected by a chain are interposed between the racks. The toothed wheels are integral with movement means for the lift, such that-the lifting unit travels a path which is twice that of the movement means for the lift. In the initial position the two racks are arranged parallel to each other. In the expanded arrangement the toothed wheels are disposed at the opposite ends of the racks. The maximum stroke of the lifting unit corresponds to about the length of the mobile rack.

U.S. Pat. No. 1,486,797 discloses a lift for vehicles wherein one toothed wheel is interposed between a first, fixed rack and a second, mobile rack. The stroke of the mobile rack is limited to about the length of the mobile rack.

SUMMARY OF THE INVENTION

The object of the present invention is to provide a vehicle lift, which permits use of smaller dimensions, for the same ratio between. the maximum height of lifting and size when the lift is lowered.

This problem is solved in the vehicle lift by means of a rack-type kinematic mechanism that maximizes the lift's elevation range and optimizes its size. Further advantageous characteristics of the said kinetic mechanism are indicated below.

BRIEF DESCRIPTION OF THE DRAWINGS

The characteristics, objects and advantages of the present invention will become more apparent from the following description and the attached drawings, relative to a non-limiting embodiment, in which the same reference numbers indicate parts which are the same or equivalent. In the various figures.

DESCRIPTION OF THE PREFERRED EMBODIMENTS

The figures illustrate schematically a rack-type kinematic mechanism 10 according to the invention, applied purely by way of example to a column-type lift.

Figure 2:
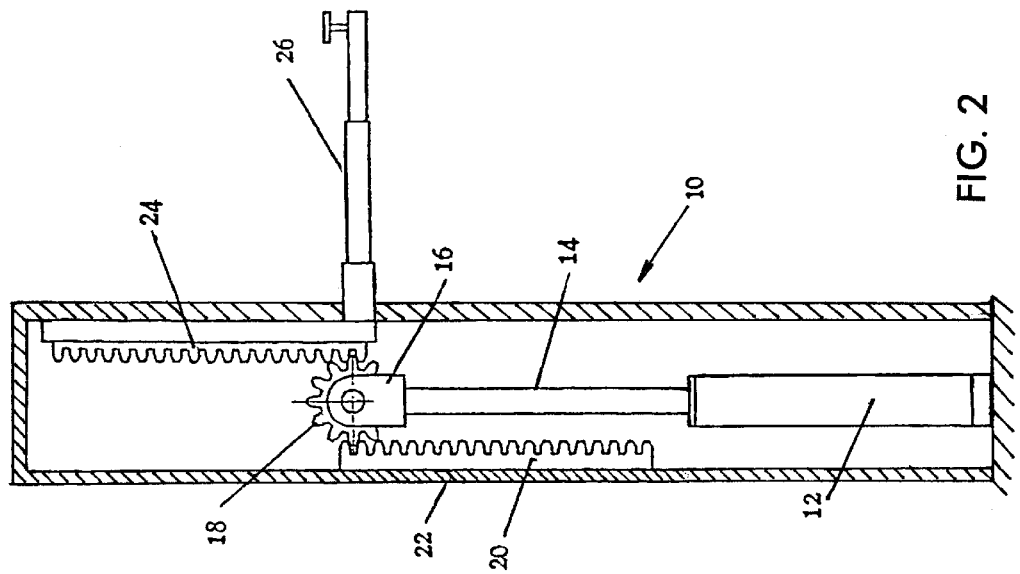
FIG. 2 is a lateral view of the rack-type kinematic mechanism in the raised position.
Figure 1:
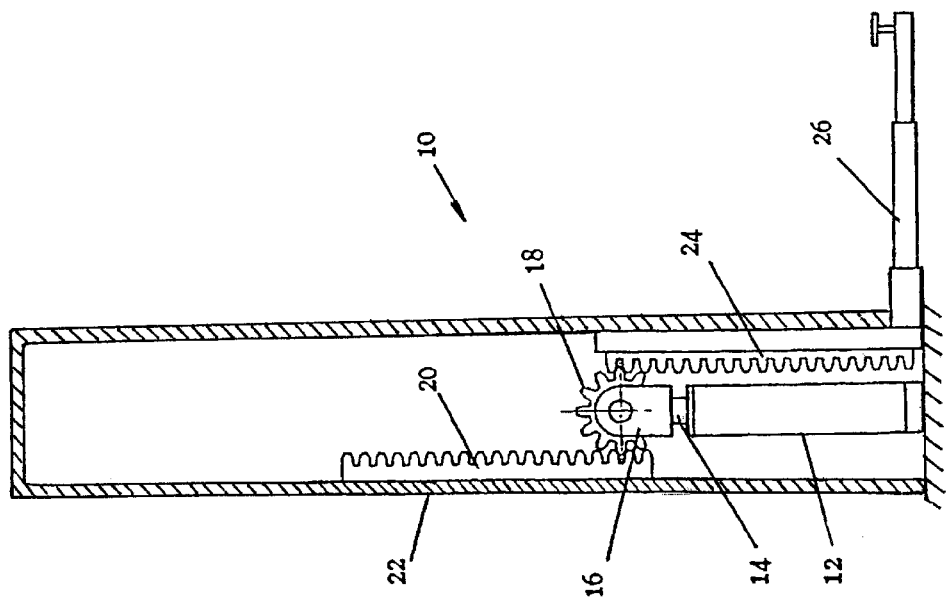
FIG. 1 is a lateral view of a rack-type kinematic mechanism according to the present invention, in the lowered position.
Figure 3:
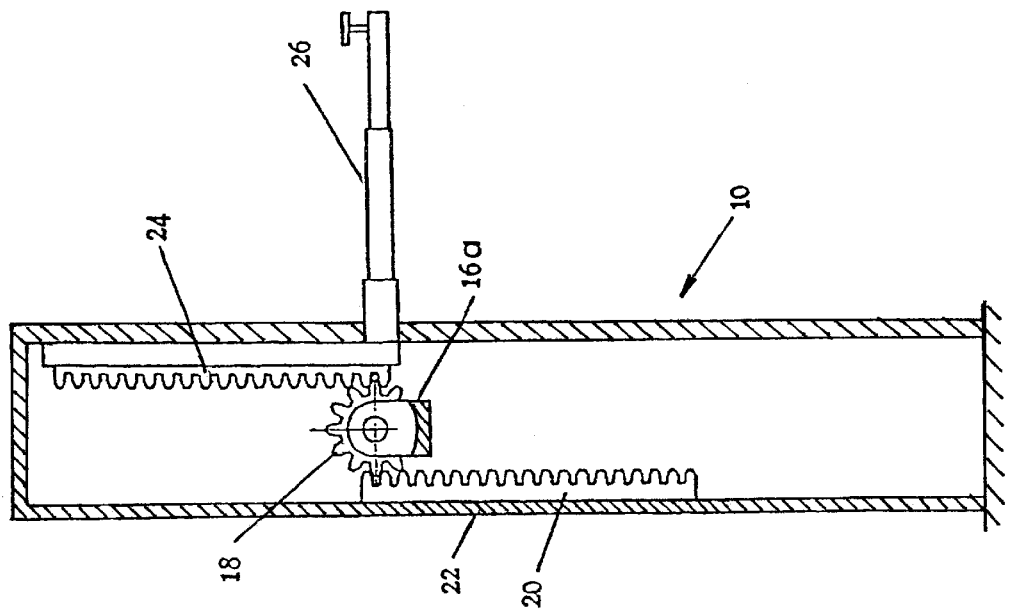
FIG. 3 is lateral view of a rack-type kinematic mechanism according to a variant of the mechanism shown in FIG. 1.
Figure 4:
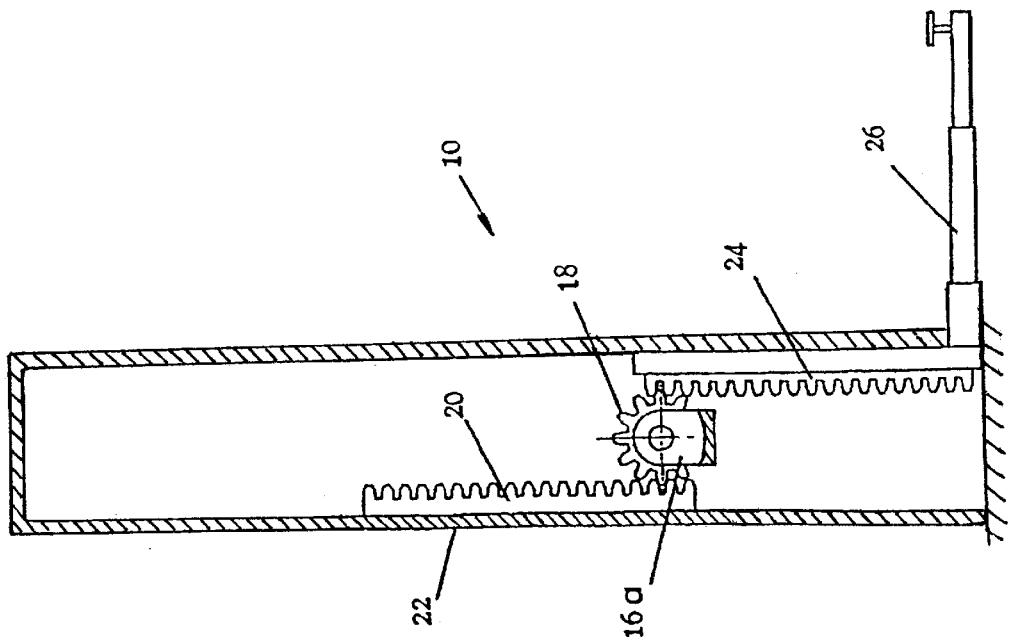
FIG. 4 is a lateral view of the rack-type kinematic mechanism in the raised position, relative to the FIG. 3 variant thereof.

The kinematic mechanism 10 comprises a cylinder 12, for example of the oleodynamic, hydraulic type, on the free end of the rod 14 of which a fork 16 is provided. Alternatively, the element 16 includes a floating motor, identified as element 16a in FIGS. 3, 4. A toothed wheel 18 is pivoted in the fork 16. The toothed wheel 18 engages on one side with a first rack 20, which for example is secured to a column 22 of the lift. The toothed wheel 18 engages on the opposite side with a second rack 24, which is also supported and guided by the column 22. A lifting unit 26, for example a lifting arm 26 or part of a lifting rail, is secured to the rack 24. The pitch and toothing of the toothed wheel 18 and of the two racks 20, 24 are identical. As illustrated in the figures, in addition, the arrangement of the toothed wheel 18 and of the two racks 20, 24 is such that at the end of travel, the latter are disposed on opposite sides relative to the toothed wheel 18.

It will be appreciated that in the functioning of the kinematic mechanism 10 according to the invention, the first rack 20 acts as a point of engagement for the kinematic mechanism 10, and as can be seen by comparing the figures, the lifting unit 26 which is connected to the second rack 24 travels a path which is twice that of the path travelled by the rod 14 of the cylinder 12. Thus, for the same lifting path of the lifting unit 26, the cylinder 12 used can have dimensions which are reduced by half in comparison with the known configurations of lifts, such that the rack-type kinematic mechanism according to the invention eliminates fully the above-described problems, bu providing a lifting mechanism which is more economical and functional.

Although in the embodiment described and illustrated above, the rack-type kinematic mechanism is fitted to a column-type lift, it is apparent that it can also be fitted to scissors-type lifts, by means of purely structural modifications which are within the capability of any average person skilled in the art.

It is apparent that numerous modifications, adaptations, completions, variants and replacements can be made to the embodiment previously described by way of illustrative, non-limiting example, without departing from the scope of the invention, as determined by the following attached claims. For example, instead of being pivoted on the end of the rod 14, the toothed wheel 18 could be connected to a rotary output of a floating two-way motor.

What is claimed is:

1. A vehicle lift, comprising a column that forms a housing for the vehicle lifts;

a first, stationary rack supported by the column;

a second rack which is mobile supports a lifting unit and guided by the column;

a toothed wheel which engages on its one side with the first rack and on its other side with the second rack;

a moving mechanism for the toothed wheel;

an arrangement of the toothed wheel and the two racks being such that in a lowered position of the second rack the toothed wheel is interposed between a lower end of the first rack, and in a raised position of the second rack the toothed wheel is interposed between an upper end of the first rack and the lower end of the mobile rack;

the toothed wheel being structured so that it is movable by the moving mechanism between first and second positions, separated by a predetermined distance, to thereby cause the lifting unit to traverse a distance about twice as large as the predetermined distance.

2. The vehicle lift according to claim 1, wherein the moving mechanism for the lift comprises an hydraulic cylinder.

3. The vehicle lift according to claim 2, wherein the toothed wheel is rotatably mounted on an end of a rod of the cylinder.

4. The vehicle lift according to claim 3, wherein the racks and the toothed wheel have the same pitches and toothing.

5. The vehicle lift according to claim 2, wherein the racks and the toothed wheel have the same pitches and toothing.

6. The vehicle lift according to claim 1, wherein the toothed wheel is rotatably coupled to a floating motor.

7. The vehicle lift according to claim 6, wherein the racks and the toothed wheel have the same pitches and toothing.

8. The vehicle lift according to claim 1, wherein the racks and the toothed wheel have the same pitches and toothing.

9. The vehicle lift according to claim 1, wherein the first and second racks have substantially equal lengths.

* * * * *